United States Patent [19]

Yoshihoka et al.

[11] Patent Number: 5,017,668

[45] Date of Patent: May 21, 1991

[54] ROOM TEMPERATURE CURABLE RESIN COMPOSITION

[75] Inventors: Hiroshi Yoshihoka, Tokyo; Masaaki Yamaya, Annaka; Hideyoshi Yanagisawa, Matsuida, all of Japan

[73] Assignee: Shin-Etsu Chemical Co., Ltd., Tokyo, Japan

[21] Appl. No.: 353,610

[22] Filed: May 18, 1989

[30] Foreign Application Priority Data

May 19, 1988 [JP] Japan .................................. 63-123279

[51] Int. Cl.$^5$ ............................................. C08F 299/08
[52] U.S. Cl. .................................................. 526/279
[58] Field of Search ........................................ 526/279

[56] References Cited

U.S. PATENT DOCUMENTS

| 3,646,155 | 2/1972 | Scott | 260/827 |
| 4,703,097 | 10/1989 | Wingler et al. | 526/279 |

FOREIGN PATENT DOCUMENTS

| 48-1711 | 1/1973 | Japan . | |
| 60-123518 | 7/1985 | Japan | 526/279 |
| 1-292018 | 11/1989 | Japan | 526/279 |

*Primary Examiner*—Joseph L. Schofer
*Assistant Examiner*—N. Sarofim
*Attorney, Agent, or Firm*—Foley & Lardner, Schwartz, Jeffery, Schwaab, Mack, Blumenthal & Evans

[57] ABSTRACT

A room temperature curable resin composition comprising a copolymer of (A) with (B) shown below:

(A) An acrylic group-containing silane compound represented by the following Formula (I):

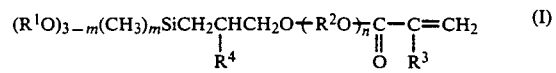

wherein $R^1$ represents a monovalent hydrocarbon group; $R_2$ represents an alkylene group having not less than 2 carbon atoms; $R^3$ and $R^4$ each represent a hydrogen atom or a methyl group; m represents 0, 1 or 2; and n represents an integer of not less than 1.

(B) A compound having an unsaturated group copolymerizable with said component (A) acrylic group-containing silane compound. This composition can be cured at an accelerated rate not only at the surface but also at the depths thereof, and may crack with difficulty after cured.

12 Claims, 2 Drawing Sheets

ROOM TEMPERATURE CURABLE RESIN COMPOSITION

BACKGROUND OF THE INVENTION

1. Field of the Invention

This invention relates to a room temperature curable resin composition, and more particularly to a room temperature curable resin composition that can be cured at an accelerated rate not only at the surface but also at the depths thereof, and give a cured product with a superior toughness.

2. Description of the Prior Art

Hitherto known as room temperature curable resins are thermoplastic resin compositions mainly comprised of a polymer having a hydrolyzable silyl group in its molecule. Known as this polymer having a hydrolyzable silyl group in its molecule are a copolymer of a monomer having an unsaturated group with an alkoxysilane having a vinyl functional group or acrylic functional group, a product obtained by grafting the above alkoxysilane onto a thermoplastic polymer (Japanese Patent Publication (KOKOKU) No. 1711/1973, etc.).

The above alkoxysilane having a vinyl functional group includes vinylsilane such as vinyltrimethoxysilane and a silane having a vinyl ether group, such as gammavinyloxypropyltrimethoxysilane. These, however, are too poor in the copolymerizability to be suitable as materials for synthesizing polymers having hydrolyzable silyl group.

On the other hand, the alkoxysilane having an acrylic functional group, as exemplified by gammamethacryloxypropyltrimethoxysilane, have a high copolymerizability but are disadvantageous in that, when the resin compositions mainly comprised of the resulting polymer are cured, they can only be cured at a log rate at the depths of the composition to be cured, and that the resulting cure product is so brittle that. It may be liable to crack.

SUMMARY OF THE INVENTION

Accordingly, an object of this invention is to provide a room temperature curable resin composition that can be cured at an accelerated rate not only at the surface but also at the depths thereof, and give a cured product having a superior toughness and producing cracks with difficulty.

As a means for solving the above problems, this invention provides a room temperature curable resin composition comprising a copolymer of (A) with (B) shown below:

(A) An acrylic group-containing silane compound represented by the following Formula (I)

$$(R^1O)_{3-m}(CH_3)_m SiCH_2 \underset{R^4}{\overset{|}{C}} HCH_2O(R^2O)_{\overline{n}}\underset{\overset{||}{O}}{C}-\underset{R^3}{\overset{|}{C}}=CH_2 \quad (I)$$

wherein $R^1$ represents a monovalent hydrocarbon group having 1 to 4 carbon atoms; $R^2$ represents an alkylene group having not less than 2 carbon atoms; $R^3$ and $R^4$ may be the same or different and each represent a hydrogen atom or a methyl group; m represents an integer of 0, 1 or 2; and n represents an integer of at least 1.

(B) A compound having an unsaturated group copolymerizable with the component (A) acrylic group-containing silane compound.

The room temperature curable resin composition of this invention can be cured at an accelerated rate not only at the surface but also at the depths thereof, and may crack with difficulty after cured.

Such effect can be obtained presumably for the following reasons. In the above copolymer that constitutes the main component of the composition of this invention, the side chain having a crosslinking point at its end is relatively long, and hence the alkoxy group that serves as a crosslinking point in curing is relatively distant from the main chain of the copolymer. As a result, the crosslinking brings about a more porous crosslinked structure and moreover the presence of hydrophilic ether groups results in a good water permeability, so that, even when the surface has been cured, the water necessary for the curing of the depths can immediately permeate into the depths of the composition to be cured, thus causing the curing reaction to proceed. Since the side chain having a crosslinking point at its end is relatively long, the cured product thus produced can be excellent in the toughness and may crack with difficulty.

DETAILED DESCRIPTION OF THE PREFERRED EMBODIMENTS

Figure 1:
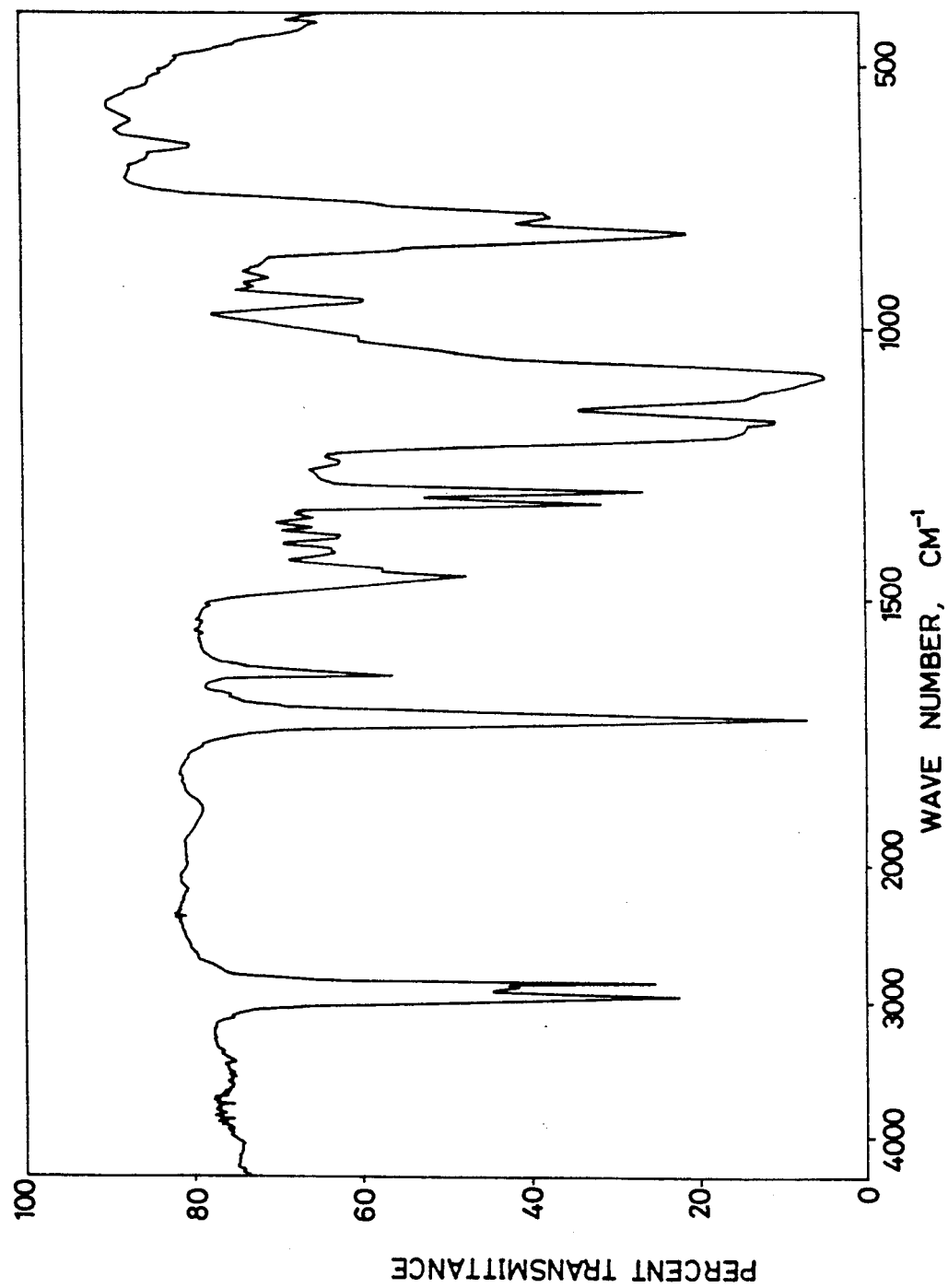
FIGS. 1 and 2 show an infrared spectrum and an NMR spectrum, respectively, of the acrylic group-containing silane compound synthesized in Synthesis Example.

In the component (A) acrylic group-containing silane compound represented by Formula (I), that constitutes the copolymer used in the composition of this invention, the monovalent hydrocarbon group represented by $R^1$, having 1 to 4 carbon atoms, may include, for example, an alkyl group such as a methyl group, an ethyl group, an n-butyl group, a t-butyl group or an n-propyl group; and an alkenyl group such as a vinyl group, an allyl group or an isopropenyl group. Preferred $R^1$ includes the methyl group and the ethyl group. The divalent hydrocarbon group represented by $R^2$, having not less than 2 carbon atoms, and preferably 2 to 4 carbon atoms, includes, for example, a methylene group, an ethylene group, a trimethylene group, a tetramethylene group, an isopropylene group or a 1,1-dimethylethylene group. Preferred $R^2$ includes the ethylene group and the isopropylene group. Also, m represents preferably an integer of 0 or 1, and n represents preferably an integer of 1 to 3.

Examples of the compound of Formula (I) include the following:

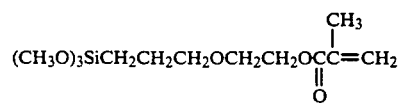

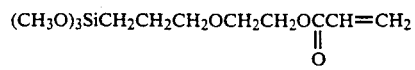

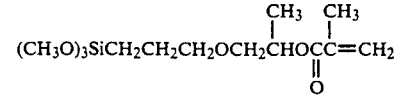

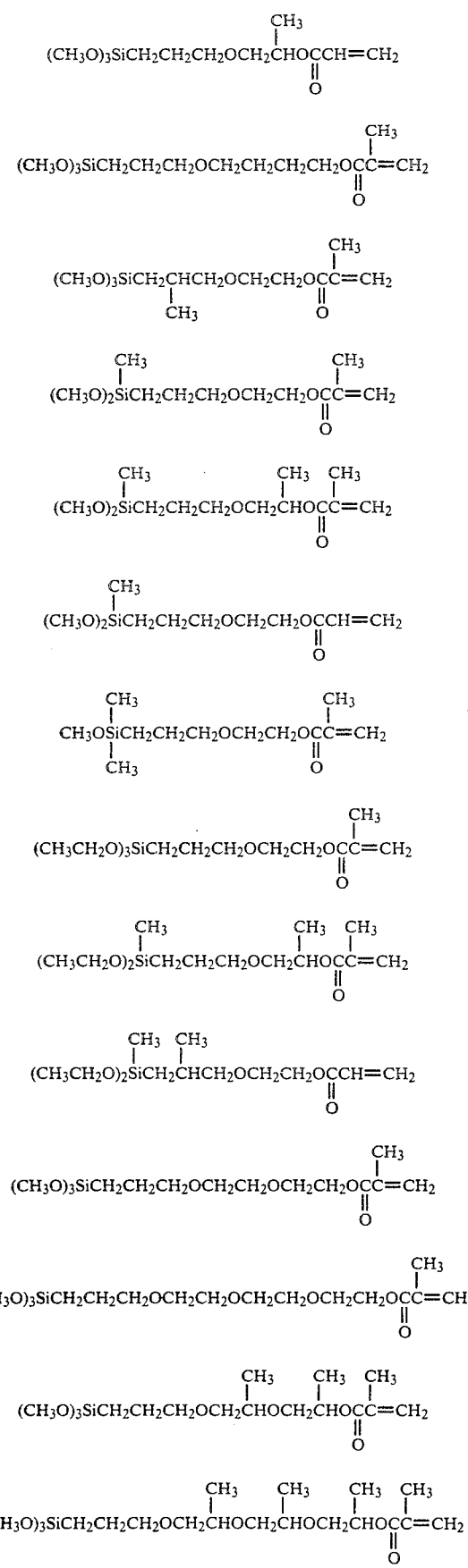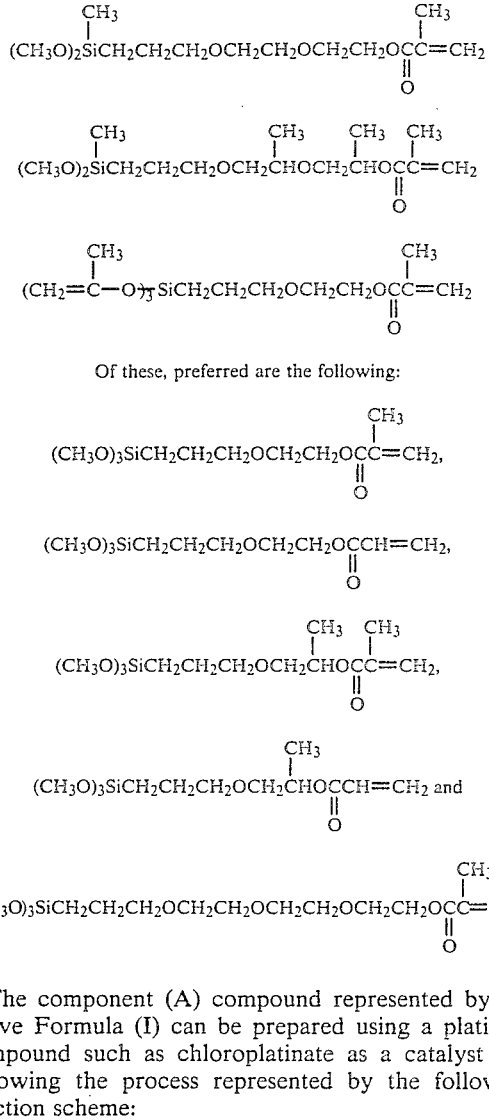

Of these, preferred are the following:

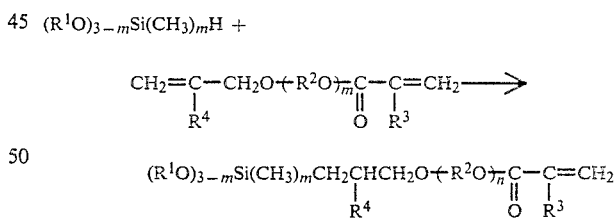

The component (A) compound represented by the above Formula (I) can be prepared using a platinum compound such as chloroplatinate as a catalyst and following the process represented by the following reaction scheme:

$$(R^1O)_{3-m}Si(CH_3)_mH +$$

$$CH_2=C(R^4)-CH_2O-(R^2O)_{\overline{m}}-C(=O)-C(R^3)=CH_2 \longrightarrow$$

$$(R^1O)_{3-m}Si(CH_3)_mCH_2CH(R^4)CH_2O-(R^2O)_{\overline{n}}-C(=O)-C(R^3)=CH_2$$

The component (B) compound copolymerizable with the above component (A), is, in general, a compound having a copolymerizable double bond, and includes, for example, olefins such as ethylene, propylene and butylene; acrylic acid, methacrylic acid, or all sorts of derivatives of acrylic acid or methacrylic acid, as exemplified by esters such as methyl methacrylate and butyl methacrylate, hydroxyalkyl esters such hydroxyethyl methacrylate, amides such as acrylamide, and perfluoroesters such as perfluorooctyl methacrylate, nonafluorobutyl methacrylate and heptafluoro-i-propyl methacrylate; fumaric acid, maleic acid, or derivatives of these; vinyl acetate, acrylonitrile, styrene, vinyl pyrrolidone, gammamethacryloxypropyltrimethoxysilane, butadiene, isoprene, chloroprene, cyclopentadiene, vinyl chloride, fluorine-containing vinyl compounds, and vinyl ether group-containing hydrocarbons. Preferred are olefins such as ethylene, propylene and butylene; butadiene acrylates or methacrylates such as methyl methacrylate, butyl methacrylate, acrylamide and hydroxyethyl methacrylate; acrylonitrile, styrene, and vinyl acetate. These can be used alone or in combination of two or more.

In the above copolymer, the ratio of the component (A)/component (B) may usually be in the range preferably of from 0.01 to 0.80, and more preferably from 0.01 to 0.2, by weight. In the above (A)/(B) range, both the curing rate of the composition obtained and the crosslink density of the cured product obtained are better.

The above copolymer, the main component of the composition of this invention, may usually have a molecular weight of from 1,000 to 500,000, and preferably from 3,000 to 50,000.

The polymerization to obtain this copolymer may be carried out by any methods such as solution polymerization, bulk polymerization, suspension polymerization and emulsion polymerization. Of these, the solution polymerization is preferred in view of the fact that the above component (A) may not be hydrolyzed in the course of polymerization. Solvents used when the solution polymerization is carried out may preferably include non-reactive solvents as exemplified by hydrocarbons such as toluene and xylene, ethers such as diisopropyl ether and dibutyl ethers, and esters such as ethyl acetate, propyl acetate and butyl acetate.

The catalyst used in preparing the copolymer includes, for example, peroxides such as benzoyl peroxide, dicumyl peroxide and di-t-butyl peroxide, and azo compounds such as azobisisobutylonitrile. Particularly preferred are dicumyl peroxide and azobisisobutylonitrile.

In preparing the copolymer, chain transfer agents such as n-dodecylmercaptan, t-dodecylmercaptan and gammamercaptopropyltrimethoxysilane can also be optionally added in the reaction system.

The polymerization reaction may usually be carried out at a temperature of from 50° to 150° C., and preferably from 60° to 100° C., and usually for about 2 to 36 hours.

In the composition of this invention, there may also be optionally added, in addition to the above copolymer, fillers such as silica, quartz powder, glass powder, alumina, clay, talc, wollastonite, titanium oxide, magnesium hydroxide and magnesium oxide; hydrolysis condensation catalysts as exemplified by amine compounds such as triethanolamine and N-beta-aminoethyl-gammaaminopropyltrimethoxysilane, carboxylic acid metal salts such as zinc octylate and tin octylate, organic tin compounds such as dibutyltin dioctate, titanates such as tetrabutyl titanate and tetrapropyl titanate, and organic aluminum compounds such as acetylacetonatoaluminum; antioxidants, age resistors, antistatic agents, etc.

The composition of this invention may be optionally diluted with a solvent so as to be convenient when stored and used. Such a solvent includes, for example, hydrocarbons such as toluene and xylene, ethers such as diisopropyl ether, dibutyl ether and tetrahydrofuran, esters such as ethyl acetate, propyl acetate and butyl ace&ate, and amides such as dimethylformamide.

The composition of this invention can be suitably used, for example, for the purpose such as water-crosslinkable polyolefins for wire covering, room temperature curable acrylic paints, etc.

EXAMPLES

This invention will be described below in detail by giving Examples and Comparative Examples.

Synthesis Example

In a 500 ml separable flask equipped with a stirrer, a thermometer, a reflux condenser and a dropping funnel, 170 g (1.00 mol) of allyl-beta-methacryloxyethyl ether represented by the formula:

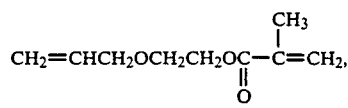

170 g of toluene, 0.2 g of 1-butanol solution of chloroplatinate (platinum concentration: 2% by weight) and 0.9 g of BHT were charged, and 115.9 g (0.95 mol) of trimethoxysilane $HSi(OCH_3)_3$ was dropwise added at 60° C. with stirring, with care so that the reaction system temperature might not exceed 70° C. After the addition was completed, the stirring was continued at 70° C. for 30 minutes to carry out the reaction.

After the reaction was completed, the reaction mixture was distilled to obtain 104.0 g of a colorless transparent liquid with a boiling point at 96° C. to 98° C./0.004 Torr. This liquid had a viscosity of 4.09 cSt, a specific gravity of 1.056 and a refractive index of 1.4354 at 25° C. Infrared absorption spectrum analysis, NMR spectrum analysis and elementary analysis were carried out to obtain the results shown below.

Infrared absorption spectrum analysis: As shown in FIG. 1. Main absorption bands are as follows:

| | |
|---|---|
| Si—O—C | 1,088 cm$^{-1}$ |
| —CO—<br>‖<br>O | 1,721 cm$^{-1}$ |
| —C═C— | 1,638 cm$^{-1}$ |
| —C—O—C | 1,170 cm$^{-1}$ |
| —CH$_2$— | 1,454, 2,842, 2,944 cm$^{-1}$ |

Figure 2:
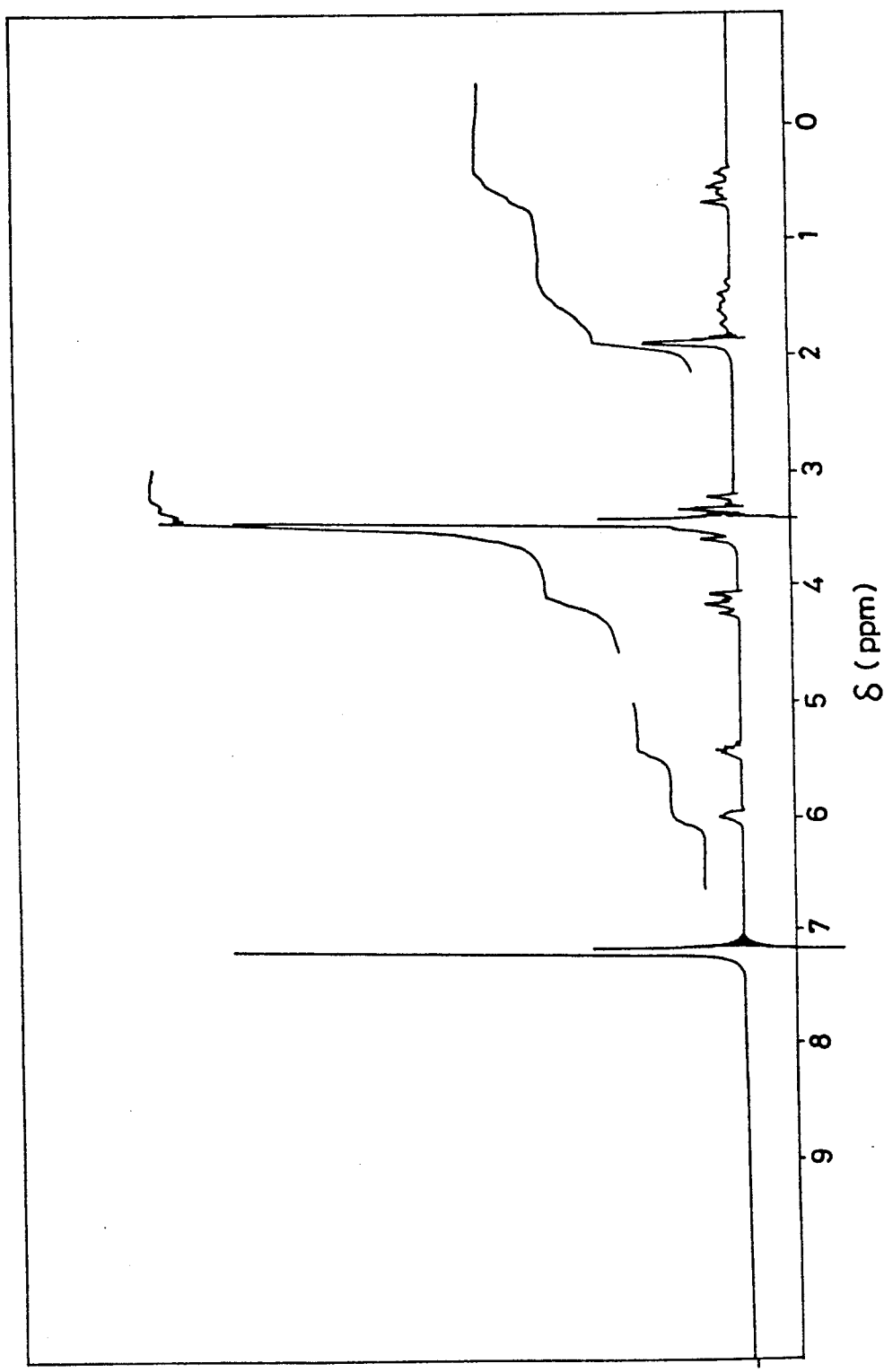

NMR spectrum: As shown in FIG. 2. Main peaks are as follows: (Internal standard: benzene, δ: 7 25 ppm; all values in ppm)

0.41 to 0.75

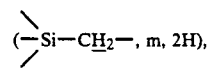

1.35 to 1.80 (Si—CH$_2$—CH$_2$—)
3.21 to 3.75 (—CH$_2$—O—$\overline{CH_2}$—, m, 4H),
4.07 to 4.32 (—$\overline{COOCH_2}$—, m, 2H),
5.37 to 5.53 (═C—H, $\overline{m}$, 1H),
5.98 to 6.10 (═C—$\overline{H}$, m, 1H),
3.50 (Si—O$\underline{CH_3}$)
1.85 to 2.00

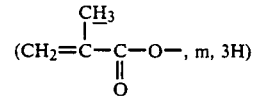

Elementary analysis:

| Elementary analysis: | Si | O | C | H |
|---|---|---|---|---|
| Calculated*: (%) | 9.61 | 32.83 | 49.29 | 8.27 |
| Found: (%) | 9.67 | 32.80 | 49.27 | 8.26 |

(*as $C_{12}H_{23}O_6Si$)

From the above results, the resulting product was confirmed to be an acrylic group-containing silane compound represented by the following formula:

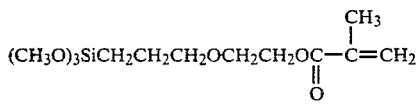

EXAMPLE 1

In a 1 liter separable flask equipped with a stirrer, a thermometer, a reflux condenser and a dropping funnel, 404.4 g of toluene was charged, and a solution containing 104 g (1 mol) of styrene, 142 g (1 mol) of n-butyl methacrylate, 100 g (1 mol) of methyl methacrylate, 58.4 g (0.2 mol) of the acrylic group-containing silane compound obtained in the above Synthesis Example and 8.09 g of azobisisobutylonitrile was dropwise added at 90° C. with stirring while the temperature in the reaction system was controlled to range from 88° to 92° C. After the addition was completed, the stirring was continued at 90° C. for 3 hours to carry out polymerization.

On the resulting copolymer, the viscosity specific gravity and refractive index at 25° C. were measured, and the molecular weight in terms of polystyrene was also measured according to GPC analysis. Curing tests and heat shock tests of the cured product were further carried out according to the following methods. Results obtained are shown in Table 1.

Curing Test

In 10 g of the copolymer, 0.1 g of dibutyltin dilaurate was added and mixed. The mixture was poured into a mold of 5 cm in length, 5 cm in width and 1 cm in depth, and put in an thermo-hygrostat having an atmosphere of 50° C. and 80% humidity, to measure the curing rate. The curing rate was evaluated based on the following criterions. A: No tackiness when touched with fingers. B: Tacky when touched with fingers. The tacky dryness of the inside was confirmed by taking out the cured product from the mold and touching the mold with fingers on its bottom part.

Heat Shock Test

The cured product of the copolymer was immersed alternately in silicone oil kept at 150° C. and liquid nitrogen kept at −196° C., for 2 minutes each. This operation was repeated three times in total, to observe whether or not there is any crack in the cured product. Measurement was made on 10 cured products.

EXAMPLE 2

Example 1 was repeated to carry out polymerization, except that toluene was used in an amount of 357.2 g and the acrylic group-containing silane compound obtained in Synthesis Example was used in an amount of 29.2 g (0.1 mol).

On the resulting copolymer, measurement was made for the viscosity, specific gravity and refractive index at 25° C., as well as the molecular weight in terms of polystyrene, according to GPC analysis, and the curing rate of the copolymer. Curing tests and heat shock tests were also carried out in the same manner as Example 1. Results obtained are shown in Table 1.

EXAMPLE 3

Example 1 was repeated to carry out polymerization, except that toluene was used in an amount of 407.2 g, and 61.2 g (0.2 mol) of the compound represented by the following formula:

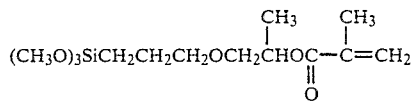

was used in place of the acrylic group-containing silane compound obtained in Synthesis Example.

In the same manner as in Example 1, measurement was made on the resulting copolymer, for the viscosity, specific gravity and refractive index at 25° C., as well as the molecular weight in terms of polystyrene, according to GPC analysis, and the curing rate of the copolymer. Curing tests and heat shock tests were also carried out. Results obtained are shown in Table 1.

EXAMPLE 4

Example 1 was repeated to carry out polymerization, except that toluene was used in an amount of 422.0 g, and 76.0 g (0.2 mol) of the compound represented by the following formula:

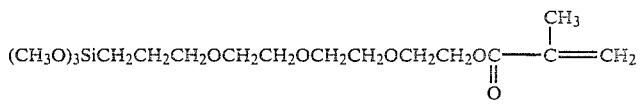

was used in place of the compound obtained in Synthesis Example.

In the same manner as in Example 1, measurement was made on the resulting copolymer, for the viscosity, specific gravity and refractive index at 25° C., as well as the molecular weight in terms of polystyrene, according to GPC analysis, and the curing rate of the copolymer. Curing tests and heat shock tests were also carried out. Results obtained are shown in Table 1.

Comparative Example 1

Example 1 was repeated to carry out polymerization, except that toluene was used in an amount of 346.0 g, and the compound obtained in Synthesis Example was not used.

In the same manner as in Example 1, measurement was made on the resulting copolymer, for the viscosity, specific gravity and refractive index at 25° C., as well as the molecular weight in terms of polystyrene, according to GPC analysis, and the curing rate of the copolymer. Curing tests and heat shock tests were also carried out. Results obtained are shown in Table 1.

Comparative Example 2

Example 1 was repeated to carry out polymerization, except that toluene was used in an amount of 395.6 g. and 49.6 g (0.2 mol) of gamma-methacryloxypropyl-trimethoxysilane was used in place of the compound obtained in Synthesis Example.

In the same manner as in Example 1, measurement was made on the resulting copolymer, for the viscosity, specific gravity and refractive index at 25° C., as well as the molecular weight in terms of polystyrene, according to GPC analysis, and the curing rate of the copolymer. Curing tests and heat shock tests were also carried out. Results obtained are shown in Table 1.

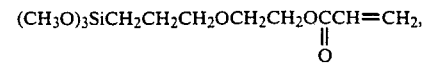

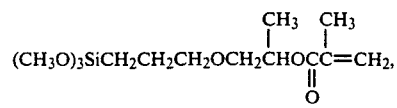

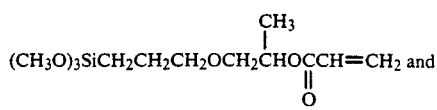

TABLE 1

| | Properties of copolymer | | | | Curing test | | | | | | |
| | | | | Molecular weight in terms of polystyrene | 30 min. | | 60 min. | | 90 min. | | Heat shock test |
| | Viscosity (cSt) | Specific gravity | Refractive index | | Surface | The depth | Surface | The depth | Surface | The depth | |
| --- | --- | --- | --- | --- | --- | --- | --- | --- | --- | --- | --- |
| Example 1 | 115.0 | 0.970 | 1.5008 | 8,000 | A | A | A | A | A | A | No cracks |
| Example 2 | 95.9 | 0.965 | 1.5028 | 7,600 | A | B | A | A | A | A | No cracks |
| Example 3 | 105.6 | 0.968 | 1.5010 | 7,800 | A | A | A | A | A | A | No cracks |
| Example 4 | 101.2 | 0.964 | 1.5005 | 8,100 | A | A | A | A | A | A | No cracks |
| Comparative Example 1 | 152.8 | 0.968 | 1.5061 | 9,500 | B | B | B | B | B | B | — |
| Comparative Example 2 | 98.9 | 0.970 | 1.5020 | 7,700 | A | B | A | B | A | A | Cracks produced |

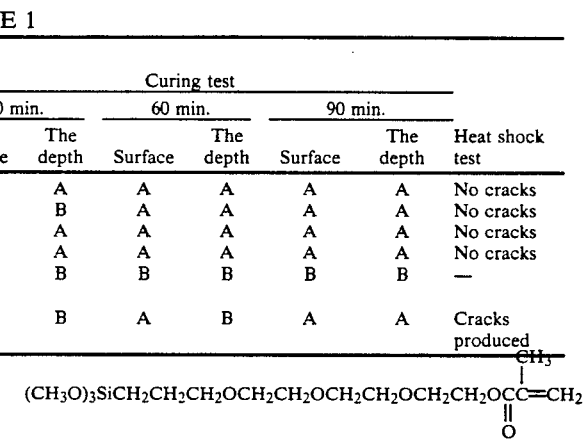

We claim:

1. A room temperature curable resin composition comprising a copolymer of
  (A) an acrylic group-containing silane compound represented by the following formula (I):

$$(R^1O)_{3-m}(CH_3)_mSiCH_2\underset{R^4}{CH}CH_2O(R^2O)_n\underset{\underset{O}{\|}}{C}-\underset{R^3}{C}=CH_2 \quad (I)$$

wherein $R^1$ represents a monovalent hydrocarbon group having 1 to 4 carbon atoms; $R^2$ represents an alkylene group having not less than 2 carbon atoms; $R^3$ and $R^4$ are the same or different and each represents a hydrogen atom or a methyl group; m is 0, 1 or 2; and n is an integer not less than 1, and
  (B) a compound having an unsaturated group copolymerizable with said compound (A), wherein said component (A) and compound (B) are present in a ratio of from 0.01 to 0.2 by weight.

2. The composition according to claim 1, wherein said component (A) is a compound represented by said formula I in which $R^1$ is a methyl group or an ethyl group, $R^2$ is an ethylene group or an isopropylene group, m is 0 or 1, and n is 1 to 3.

3. The composition according to claim 1, wherein said component (A) is at least one selected from the group consisting of the compounds having the formulas:

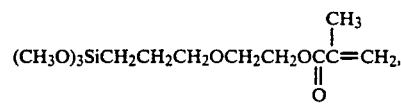

4. The composition according to claim 1, wherein said component (B) comprises a vinyl group-containing compound.

5. The compound according to claim 4, wherein said vinyl group-containing compound is at least one member selected from the group consisting of acrylic acid, acrylates, methacrylic acid, methacrylates, ethylene, propylene, butylene, butadiene, styrene, vinyl acetate, vinyl ether group-containing hydrocarbons and acrylonitrile.

6. The composition according to claim 1, wherein said copolymer has a molecular weight of from 1,000 to 500,000.

7. The composition according to claim 5, consisting essentially of the recited components.

8. The composition according to claim 1, consisting essentially of said copolymer.

9. The composition according to claim 8, wherein said component (B) comprises a vinyl-group containing compound.

10. The composition according to claim 9, wherein said vinyl-group containing compound is at least one member selected from the group consisting of acrylic acid, acrylates, methacrylic acid, methacrylates, ethylene, propylene, butylene, butadiene, styrene, vinyl acetate, vinyl ether group-containing hydrocarbons and acrylonitrile.

11. The composition according to claim 10, consisting essentially of the recited components.

12. The composition according to claim 8, wherein said copolymer has a molecular weight of from 1,000 to 500,000.

* * * * *